US011685006B2

(12) United States Patent
Lang et al.

(10) Patent No.: US 11,685,006 B2
(45) Date of Patent: Jun. 27, 2023

(54) FEEDER FOR SWAGEABLE LOCKBOLT COLLARS AND METHOD OF USING SAME

(71) Applicant: Gage Bilt, Inc., Clinton Township, MI (US)

(72) Inventors: Kyle R. Lang, Clarkston, MI (US); Tony P. Potts, Warren, MI (US); Brian H. Leigh, Macomb, MI (US); Thomas M. Duchene, Clinton Township, MI (US)

(73) Assignee: Gage Bilt, Inc., Clinton Township, MI (US)

( * ) Notice: Subject to any disclaimer, the term of this patent is extended or adjusted under 35 U.S.C. 154(b) by 246 days.

(21) Appl. No.: 17/130,356

(22) Filed: Dec. 22, 2020

(65) Prior Publication Data
US 2021/0162553 A1    Jun. 3, 2021

Related U.S. Application Data

(62) Division of application No. 16/159,216, filed on Oct. 12, 2018, now Pat. No. 11,364,579.

(51) Int. Cl.
*B23P 19/00* (2006.01)
*B21J 15/02* (2006.01)
(Continued)

(52) U.S. Cl.
CPC ........... *B23P 19/004* (2013.01); *B21J 15/022* (2013.01); *B21J 15/105* (2013.01); *B21J 15/32* (2013.01); *B21J 15/38* (2013.01); *F16B 19/05* (2013.01)

(58) Field of Classification Search
CPC ........ B21J 15/022; B21J 15/105; B21J 15/32; B21J 15/38; B23P 19/004; B23P 19/007; B23P 11/005; F16B 19/05; B25B 27/10; B25B 27/146; B25B 7/02; B25B 31/00; Y10T 29/53996; Y10T 29/53657; Y10T 29/5367; Y10T 29/53678; Y10T 29/53896;
(Continued)

(56) References Cited

U.S. PATENT DOCUMENTS 3,143,903 A    8/1964  Hecke
3,760,485 A    9/1973  Smith
(Continued)

OTHER PUBLICATIONS

International Search Report and Written Opinion in co-pending PCT Application PCT/US2019/050279 dated Nov. 18, 2019.

*Primary Examiner* — Tyrone V Hall, Jr.
*Assistant Examiner* — Makena S Markman
(74) *Attorney, Agent, or Firm* — Young Basile Hanlon & MacFarlane, P.C.

(57) ABSTRACT

A device is disclosed for supplying swageable collars from a magazine to a swaging tool such that the collars may be affixed to the shanks of lockbolts in a series of application steps. The feeder device can be mounted on the nose assembly of a swaging tool so that collar feeding and swaging can be accomplished in a single-handed operation. The feeder device responds to contact pressure against a work surface during a collar placement maneuver to release a collar from a presentation position for normal swaging. Releasing pressure on the workpiece allows a lower assembly of the feeder device to lift the next collar available from a magazine into the presentation position for application to the next lockbolt shank in a series of lockbolts to be finished.

2 Claims, 13 Drawing Sheets

(51) Int. Cl.
  *B21J 15/10* (2006.01)
  *B21J 15/38* (2006.01)
  *B21J 15/32* (2006.01)
  *F16B 19/05* (2006.01)

(58) Field of Classification Search
  CPC ............. Y10T 29/539; Y10T 29/53917; Y10T 29/53987; B21D 39/04; B21D 39/046; B21D 39/048
  See application file for complete search history.

(56) References Cited

U.S. PATENT DOCUMENTS

| | | |
|---|---|---|
| 4,604,889 A | 8/1986 | Sukharevsky |
| 4,852,376 A | 8/1989 | Suhov |
| 5,490,311 A | 2/1996 | Rosier |
| 5,697,521 A | 12/1997 | Dixon |
| 7,677,853 B2 | 3/2010 | Donovan |
| 7,921,530 B2 | 4/2011 | Mercer et al. |
| 9,511,416 B2 | 12/2016 | Godfrey et al. |
| 10,081,050 B2 | 9/2018 | Godfrey |
| 2004/0205950 A1 | 10/2004 | Schmitt |
| 2007/0157453 A1* | 7/2007 | Tomchick .............. B21J 15/022 29/525.01 |
| 2014/0201972 A1 | 7/2014 | Butvin et al. |
| 2018/0073539 A1* | 3/2018 | Suttles .................. B23P 19/002 |

* cited by examiner

FEEDER FOR SWAGEABLE LOCKBOLT COLLARS AND METHOD OF USING SAME

This application is a divisional of U.S. patent application Ser. No. 16/159,216 filed on Oct. 12, 2018 and incorporates herein the entirety of that application.

This document discloses a method and apparatus for feeding swageable collars to a presentation position on a swaging tool in such a fashion that the collars may be serially swaged onto the shanks of pre-located lockbolts in a convenient and efficient fashion.

FIELD OF THE INVENTION

Background of the Invention

A well-known mechanical fastening system involves the use of lockbolts each having a head and a grooved shank designed to receive a swageable collar which, after being placed on the shank, is deformed into substantially permanent association with the lockbolt shank. The finished lockbolt has fastening characteristics similar to conventional rivets.

The process for installing lockbolts begins with placing the lockbolts in preformed holes in the parts to be joined; the shanks of the lockbolts are exposed awaiting the placement of collars thereon and the swaging of those collars into permanent association with the lockbolt shank by a manually operated tool.

The operator of the tool places a collar on each lockbolt and thereafter triggers the tool to swage; i.e., deform the collar into permanent association with a grooved portion of the lockbolt shank. The tool also typically breaks off a portion of the shank known as a "pintail".

Collar feeders can be separate from the swaging tool; for example, expired U.S. Pat. No. 5,697,521 assigned to Huck International shows a hand-held collar dispenser with spring bias clips 44 feeding collars one at a time to a presentation or "ready" position. Another collar feeder is described is U.S. Pat. No. 9,511,416 assigned to Gage Bilt Inc. of Clinton Township Mich., the Applicant in the present application.

BRIEF SUMMARY OF THE INVENTION

Figure 15:
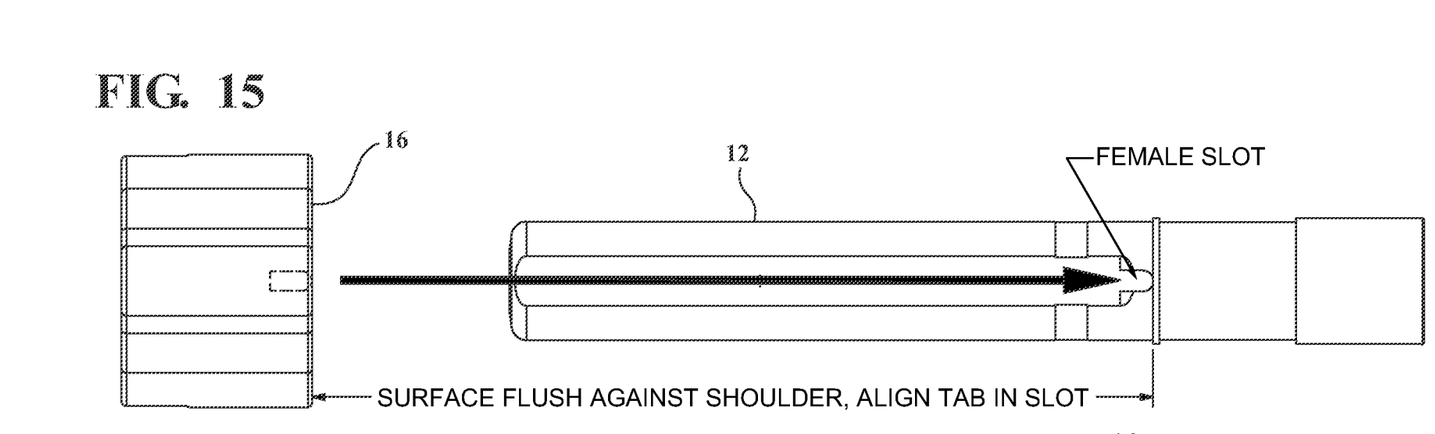
FIG. 15 shows the unique design of the female slot on the barrel of the nose assembly and the male tab on the rear stationary body.
Figures 16A, 16B:
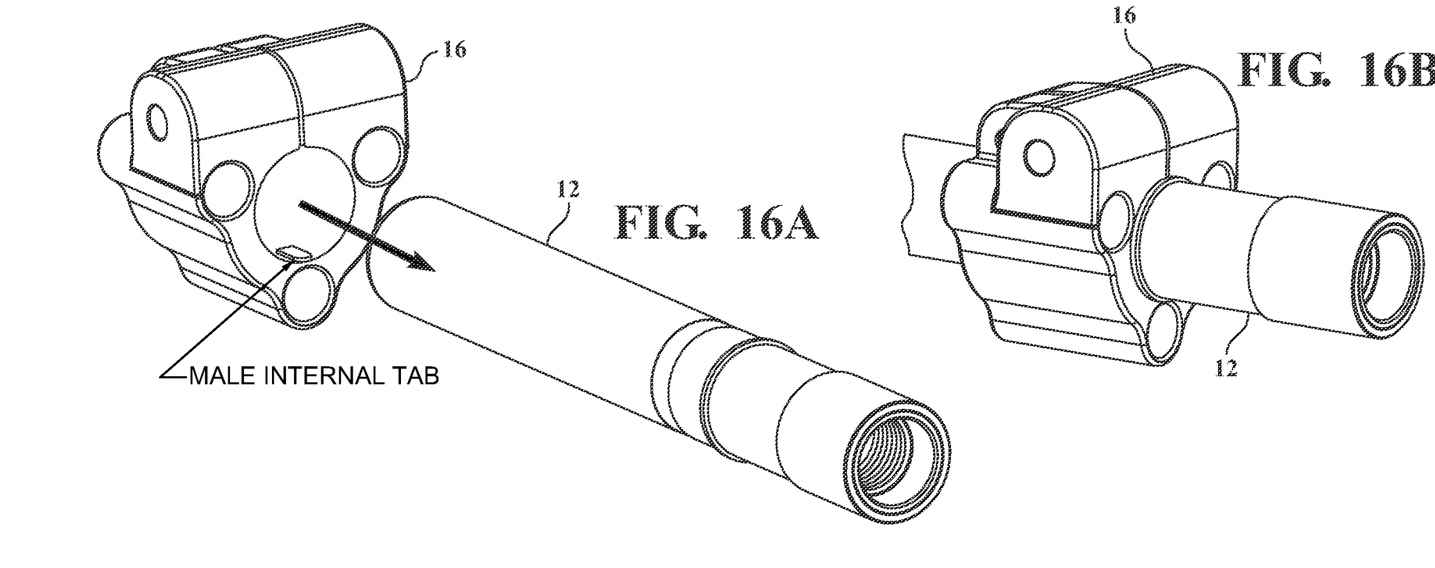
FIGS. 16A and 16B show the rear stationary body apart from the nose assembly and fully engaged into the slot on the barrel of the nose assembly and positioned against the shoulder, respectively.

According to the apparatus aspect of the subject matter disclosed herein, a collar feeder device is constructed separate from, but easily attached to, the nose assembly of a swaging tool such as the model GB731 available from Gage Bilt Inc. of Clinton Township, Mich. The collar feeder device comprises four main components: a rear stationary body, a lower assembly, a front movable body, and an actuator assembly. The rear body is configured with a male internal tab that can be lined up on a female slot located on the barrel-like nose assembly of the swaging tool, allowing the device to be set radially while also allowing the device to stop on the shoulder of the barrel that controls how far the device goes onto the barrel (FIGS. 15 & 16) (Ref: Gage Bilt LGP06-2480-45CF). The lower assembly 10 is adapted to be pivotally attached to a front movable body 100. The lower assembly carries a gripper that transfers collars from a loading position to a presentation position. The actuator assembly responds to the tool being pushed against a workpiece to initiate pivotal and retraction movement between the front movable body, rear stationary body and the lower assembly during a collar installation process.

The term "presentation position", as used herein, refers to the ready position of a collar at the front of the feeder device and in alignment with the operating axis of the swaging tool whereby an operator can slide the collar onto the exposed shank of a pre-positioned lockbolt. The term "loading position" refers to the position of collars being fed into the device for serial application to lockbolt shanks prior to being raised to the presentation position.

As further described herein, with respect to an illustrative embodiment of the invention, the actuator assembly is located on the front of the front movable body 100 assembly and includes a pair of parallel spring arms providing a resilient "collapse" function that produces the pivotal motion between the front movable body and lower assemblies.

In operation, the operator places the actuator in contact with a work surface adjacent the exposed shank of a lockbolt and with a collar in alignment with the lockbolt shank but not yet swaged. The operator thereafter pushes the tool forward such that the front of the actuator assembly contacts the surface of the workpiece in which a collarless lockbolt has been placed for final attachment. This forward push compresses springs in the aforementioned actuating arms, releasing a collar onto the lockbolt. The operator then pulls the trigger on the tool to swage the now in-place collar. This resilient compression action also causes the actuating arms to bottom out inside the front movable body 100 thus causing the front movable body and the lower body to remain stationary while the barrel of the nose assembly and the rear stationary body are drawn forward swaging the collar by the use of secondary springs 30. When the operator withdraws the tool, the lower assembly springs 32 re-extend; the lower assembly then pivots back up and a gripper mounted on the lower assembly picks up the next collar from the supply and places it in the presentation position.

The feeder device is adapted to be connected to a collar supply device such as an air-driven tube loaded with serially-arranged co-axial collars. In brief, movement between the front movable body and lower feeder assemblies, caused by steps performed by the tool operator, transfers collars one at a time between the outlet of the supply tube and a presentation position on the front movable body assembly. As the operator places a collar on a lockbolt, activates the tool to swage the collar and withdraws the tool from the finished lockbolt, the feeder automatically places the next collar in the presentation position.

BRIEF DESCRIPTION OF THE DRAWING

The inventive subject matter disclosed herein has both apparatus and method aspects, both of which are described below with reference to the accompanying drawings, showing an operative embodiment of the apparatus invention in detail. The drawings are to scale unless otherwise indicated.

DETAILED DESCRIPTION AN ILLUSTRATIVE EMBODIMENT

Referring to the Figures, the collar feeder device 10 is shown both individually and as mounted on the nose assembly 12 of a Gage Bilt Model GB731 swaging tool 14. The feeder device 10 comprises a rear stationary body assembly 16 configured to be removably mounted on the nose assembly 12 of the swaging tool 14, a movable front assembly 100 and a pivotal lower assembly 18 having a gripper adapted to receive collars serially from a collar magazine tube 44 and transfer them, one at a time, to a "presentation" position in line with the nose assembly. The assembly 16 is partially split by a longitudinal slot to allow mounting the device on the nose assembly. Screws 15 tightens the two sides to secure device 10 in place on the nose assembly 12. The lower assembly 18 has "dog leg" shaped arms that straddle the front moveable assembly 100 and the rear stationary assembly 16. The lower assembly arm members 18A and 18B are connected to the rear stationary assembly 16 at the rearward end by means of a pivot pin 20 which receives one of the screws 15 and allows the lower assembly arms to move angularly about the axis of pivot pin 20 between a raised "presentation" position shown in FIGS. 2, 3, 8, and 9 and a lower loading position shown in FIGS. 10 and 11. Slots 101 become parallel to the nose assembly when the lower assembly reaches the loading position thus allowing the lower and front movable assemblies to remain stationary while the barrel and the rear stationary body are urged forward during the swaging process of the collar.

The arms 18A and 18B are each configured with diagonal slots 22 which receive the shanks of shoulder bolts 24 threaded into slidable elements 34 in the front movable body assembly 100 to cause the pivotal motion between the front movable body 100 and rear stationary body 16 and 18 respectively as hereinafter described.

Figure 1:
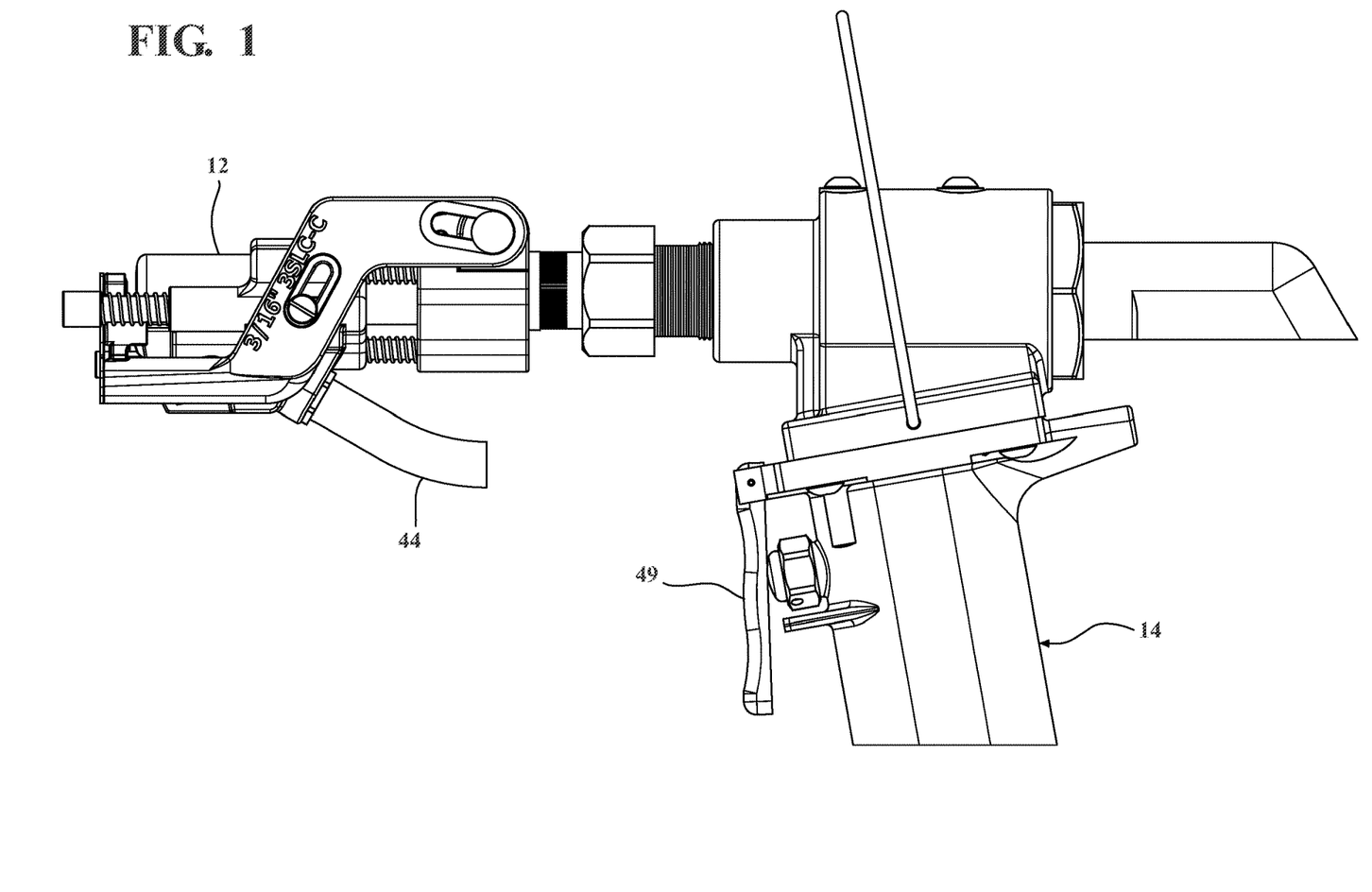
FIG. 1 is a side view of a collar feeder mounted on a Gage Bilt Model GB731 swaging tool.
Figure 2:
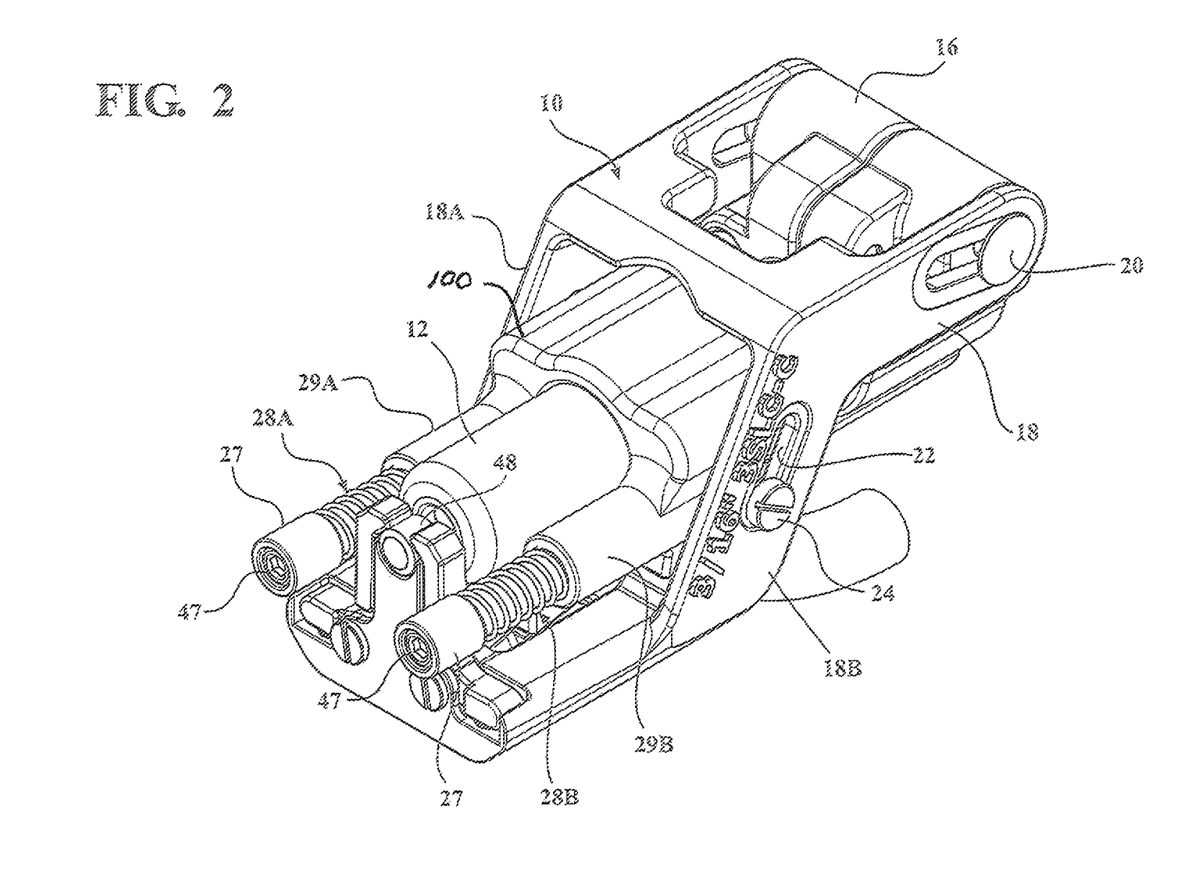
FIG. 2 is a perspective view of the feeder apparatus mounted on a swaging tool nose piece.
Figures 3, 4:
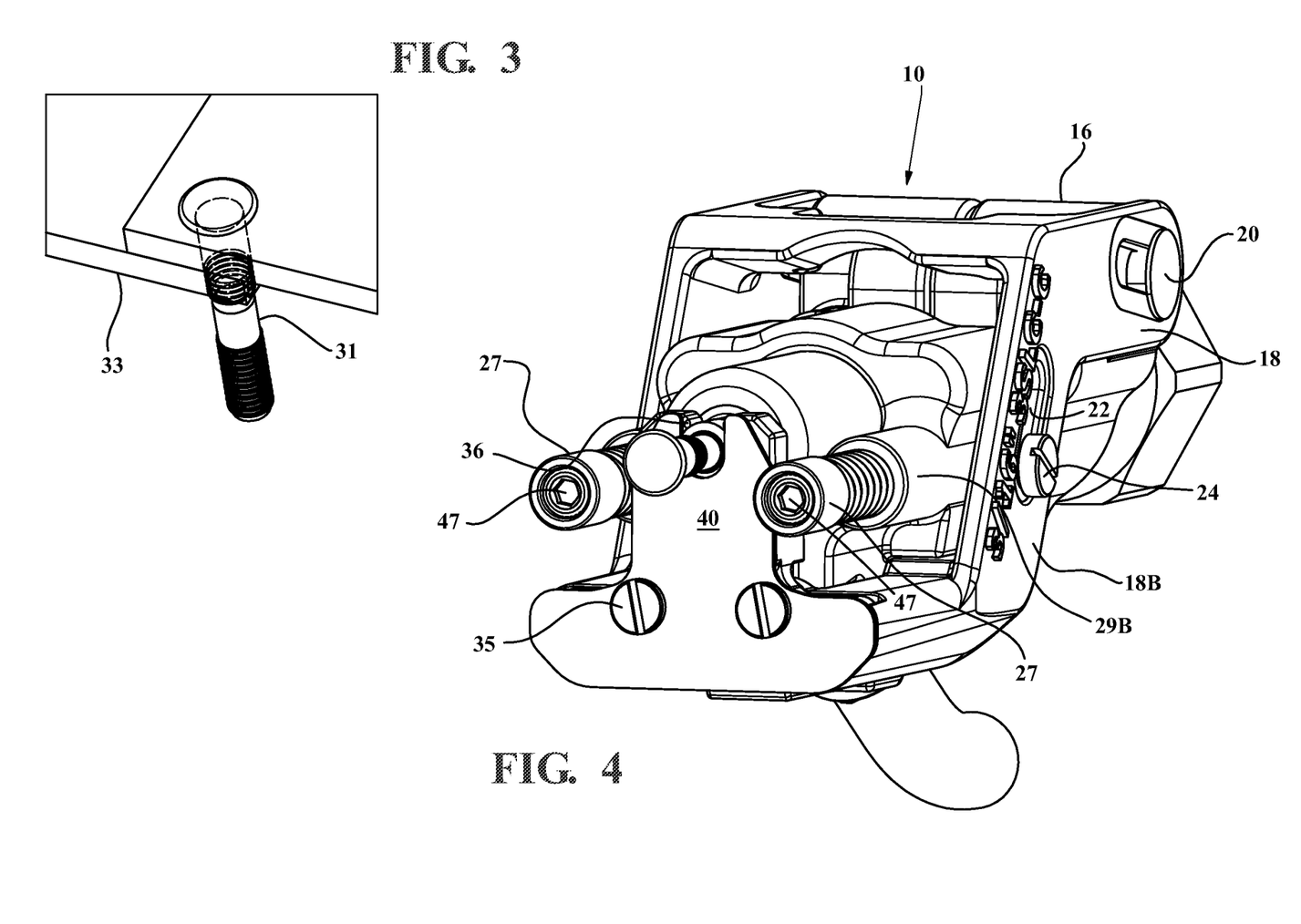
FIG. 3 is a perspective view of a pintail type lockbolt mounted in a pair of plates to be fastened together and is not to scale as far as representing the entire spectrum of workpieces that can be joined by lockbolts.
FIG. 4 is a front perspective of the feeder moving a collar onto a lockbolt, but with the lower assembly still in the raised position.
Figure 5:
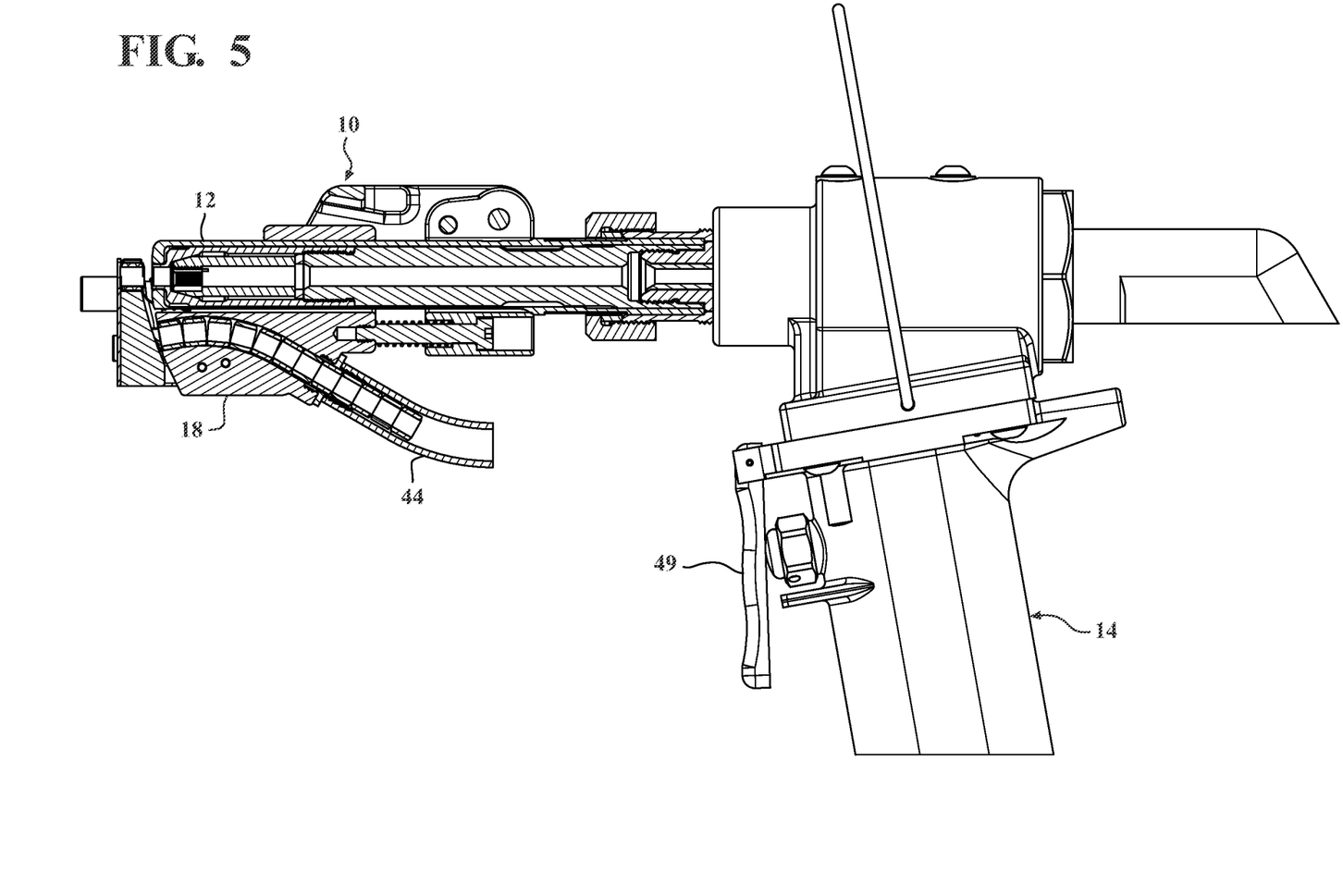
FIG. 5 is a side view, partly in section, showing the tool and feeder placing a collar on a lockbolt before swaging.

As shown in FIG. 2, the actuator assemblies 26, 28A-28B which are housed within left and right tubular portions 29A and 29B of the front movable body assembly 100. Screws 47 are sunk into recesses in member 27. Within each of the tubular assemblies 29A and 29B are comprising primary springs 32 (see FIG. 13) as well as slide rods 34 between the springs to allow the actuator assembly 28A-28B to be resiliently moved toward the rear stationary body assembly 16 by pressure exerted by an operator who places the contact members 27A-27B against a workpiece and pushes the tool 14 and the feeder assembly 10 toward the workpiece as hereinafter described. In the embodiment illustrated, a second stage of movement can be caused by the tool in performing swaging operation. The primary springs 32 in the illustrated embodiment have a lower spring compression coefficient than the secondary springs 30 and therefore compress to a greater extent than the secondary springs when the operator pushes the device 10 toward the workpiece 33 in which lockbolts 31 are pre-installed. As an alternative, the operator can fully depress a set of assemblies by pushing against a workpiece surface.

Figure 13:
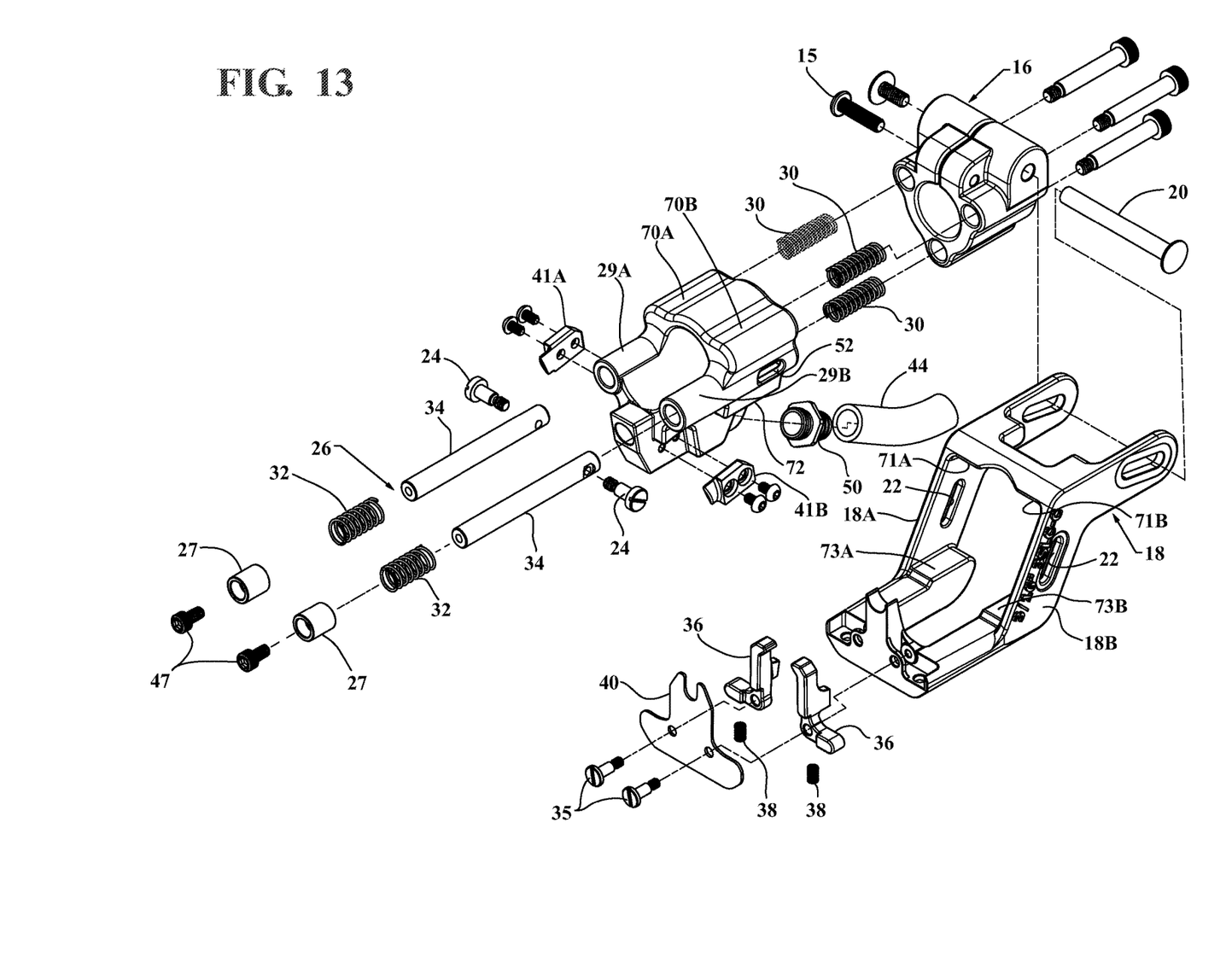
FIG. 13 is an exploded view showing all of the parts of the feeder device.
Figure 14:
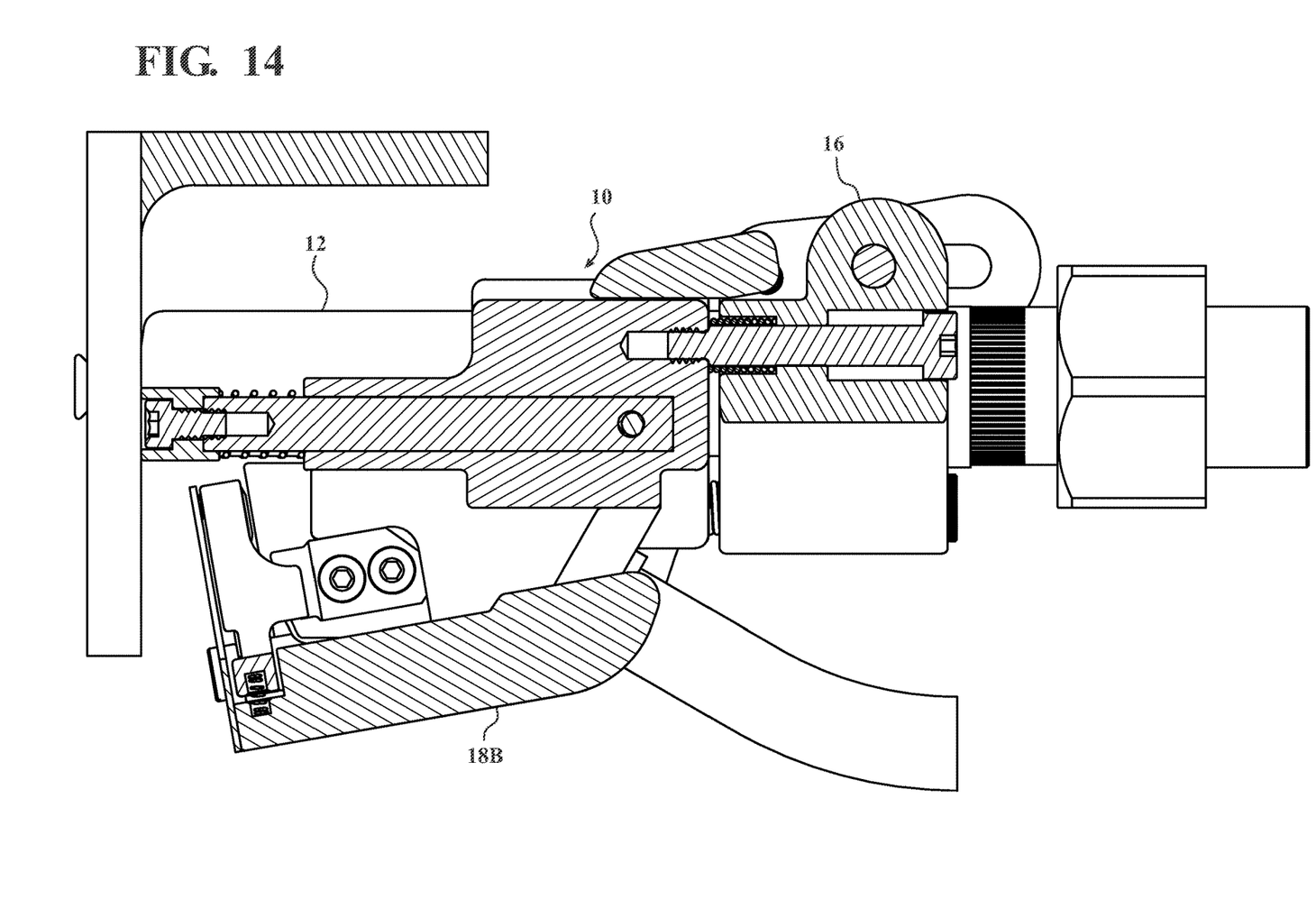
FIG. 14 is a side view in section of the feeder showing the lower assembly and the front moveable assembly when the barrel and the rear stationary body are urged forward during the swaging of the collar.

The lower assembly carries a number of components including a gripper 36 with left and right arms connected to the lower assembly by screws 35 and held in a closed or gripping position by means of a spring 38 that fits into blind holes on the bottom of the gripper elements as shown in FIG. 13 to hold a lockbolt collar in the presentation position ready to be applied to the shank of a lockbolt. The gripper is opened by cams 41A and 41B mounted on the front movable body 100 assembly to open and receive a collar from the magazine 44 when the lower assembly is moved down to the lower position shown in FIG. 10.

The lower assembly 18 also carries a metal stop plate 40 which is screwed onto the forward distal ends of the parallel legs in front of the gripper 36.

The device 10 is connected to receive collars from an attached tubular magazine 44 which may be in the form of a flexible hose. The collars are driven toward the locator stop plate 40 by air pressure from a source (not shown) so that the collars continue to arrive into the loading position against stop plate 40 one at a time.

The tool has a trigger 49 which the operator uses to trigger the swaging operation once the lockbolt in the presentation position has been appropriately placed on the shank of a lockbolt and the tool and feeder assembly are urged toward a work surface as described above. Details of the power tool are omitted herein but can be seen in full in the product brochure available from Gage Bilt Products, Inc. by written request to 44766 Centre Ct, Clinton Twp, Mich. 48038 attention Bruce Godfrey.

Figure 9:
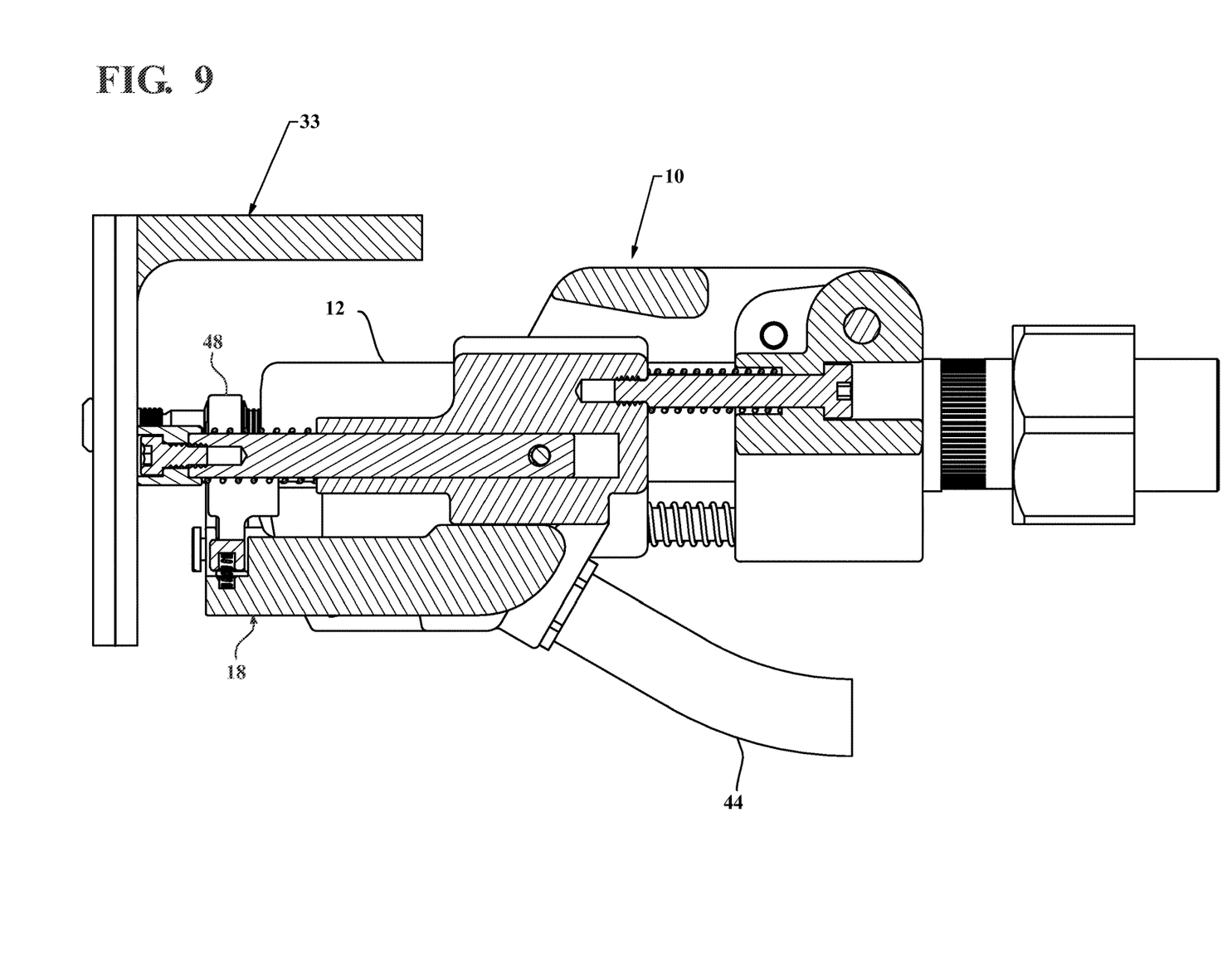
FIG. 9 shows the feeder in section and in the same position as shown in FIG. 8.
Figure 11:
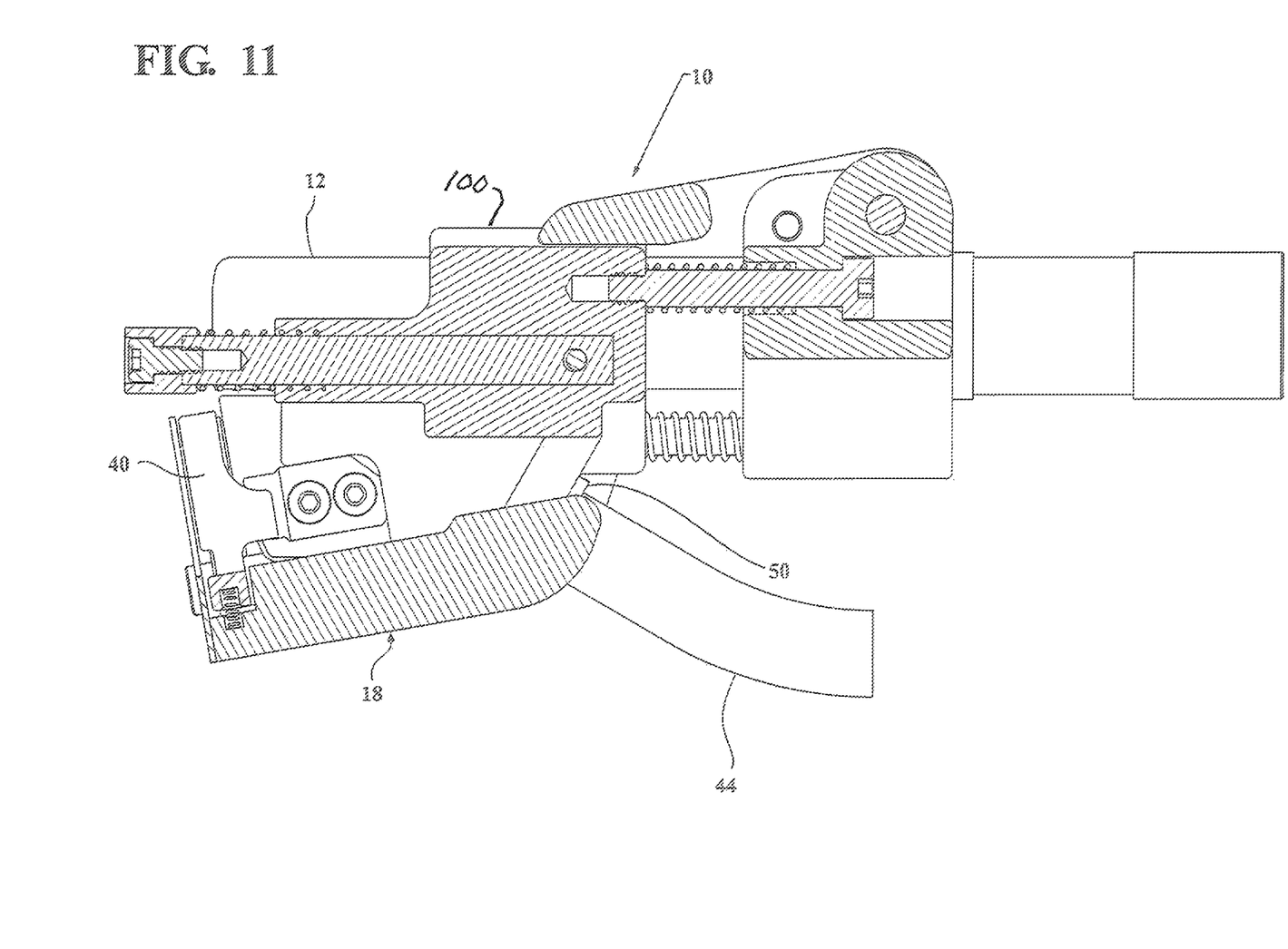
FIG. 11 shows the feeder in the same position as FIG. 10, but in section to show interior detail of the actuator assembly.

Turning now to FIGS. 2 through 12, FIG. 2 shows in perspective the feeder device 10 with a lockbolt collar 48 in the presentation or "ready" position and the lower assembly 18 in the fully raised position. This is evident from the position of the shoulder bolts 24 at the lower ends of slots 22 and it will be understood from reference from FIG. 13 that the shoulder bolts 24 are threaded into the slidable rods 34 which are part on the compressible spring assemblies through slots 52 in the tubular portions 29A and 29B of the front moveable body assembly 100 so that movement of the rods toward the rear of feeder 10 causes a camming function driving the shoulder bolt shanks upwardly in the slots 22 and causing counter-clockwise pivotal motion of the lower assembly 18 as hereinafter described. Limit stops are provided on the upper and lower assemblies, more specifically, FIGS. 9, 11, and 13 show stop pads 70A, 70B on the front movable body assembly 100 and pads 71A, 71B on the lower assembly 18 to limit downward motion of the lower assembly 18 relative to the front movable body assembly 16. Similarly, stop pads 72 on the front movable body assembly and co-acting pads 73A, 73B on the lower assembly limit upward movement of the lower assembly 18 back toward the front movable body assembly 100 to the position shown, for example, in FIG. 7.

Figure 6:
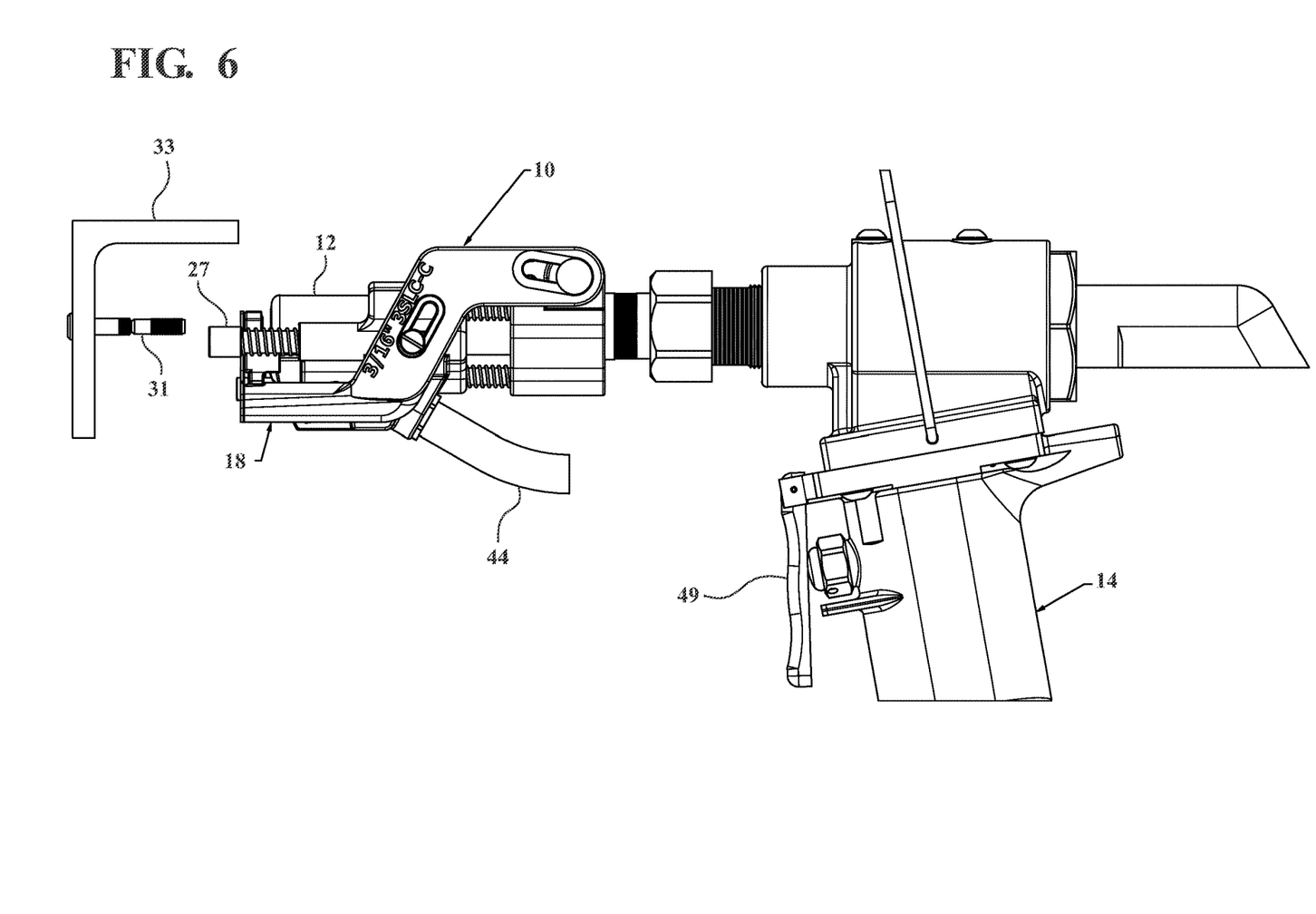
FIG. 6 is a side view of the feeder approaching a lockbolt ready for receipt of a collar.
Figure 8:
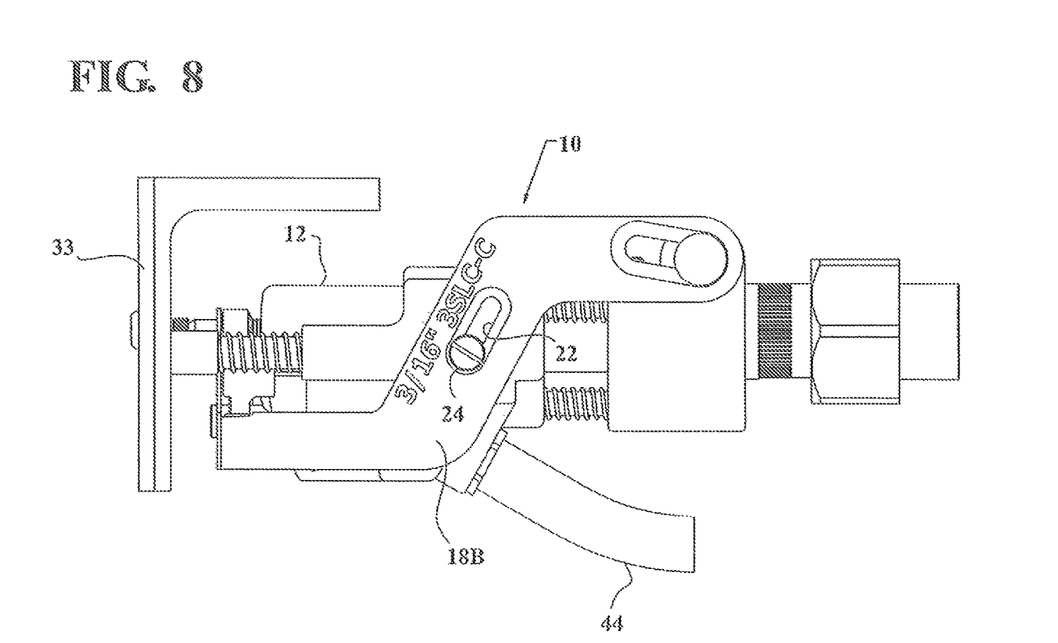
FIG. 8 shows the feeder placing a collar on the lockbolt but not yet urged forward to compress the springs in the actuator assembly.

The side view of FIGS. 6 and 8 shows the feeder 10 mounted on the nose assembly of the tool 14 and with lower assembly 18 still in the raised position. The feeder assembly 10 ready to place a lockbolt collar onto the shank 31 of lockbolt.

Figure 10:
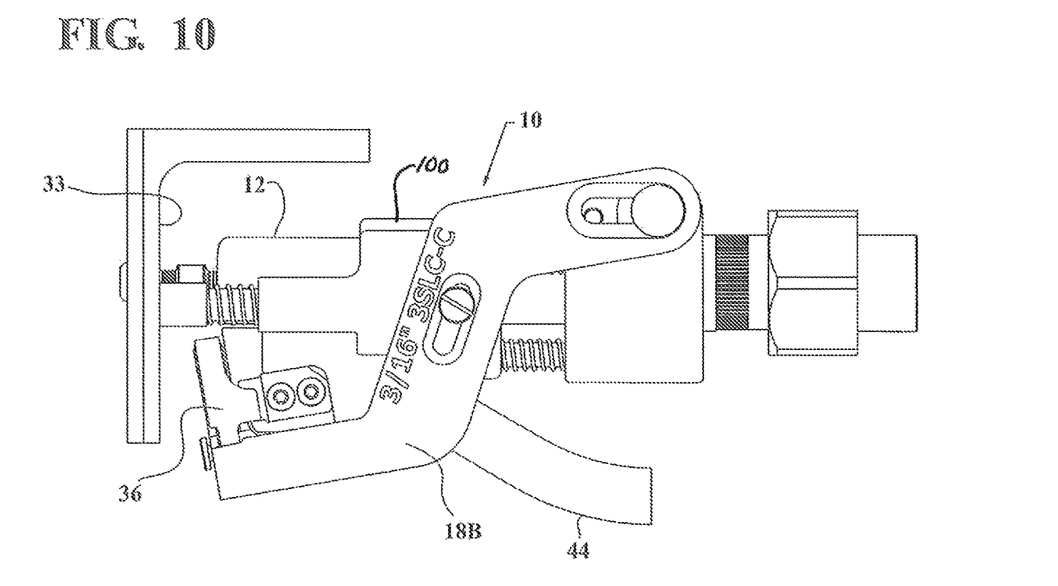
FIG. 10 shows the feeder after it has been pushed against the workpiece to pivot the lower assembly down to pick up the next lockbolt collar from the supply tube.

FIG. 10 shows the feeder device 10 advanced forwardly so that the collar in the presentation position is now on the shank of the lockbolt and the actuator assembly 28A-28B are in contact against the surface of the work piece 33.

As shown in FIGS. 10 and 11, the operator pushes the feeder device and the tool forward against the work surface, fully compressing the primary spring assemblies and driving the shoulder bolts upwardly along the slots 22 to pivot the lower assembly 18 downwardly to open the gripper jaws. The lockbolt collar in the presentation position is thereby free so that the nose assembly 12 of the swaging tool 14 can perform the swaging function as well the function of pulling the pintail off of the lockbolt shank where it becomes waste.

Figure 12:
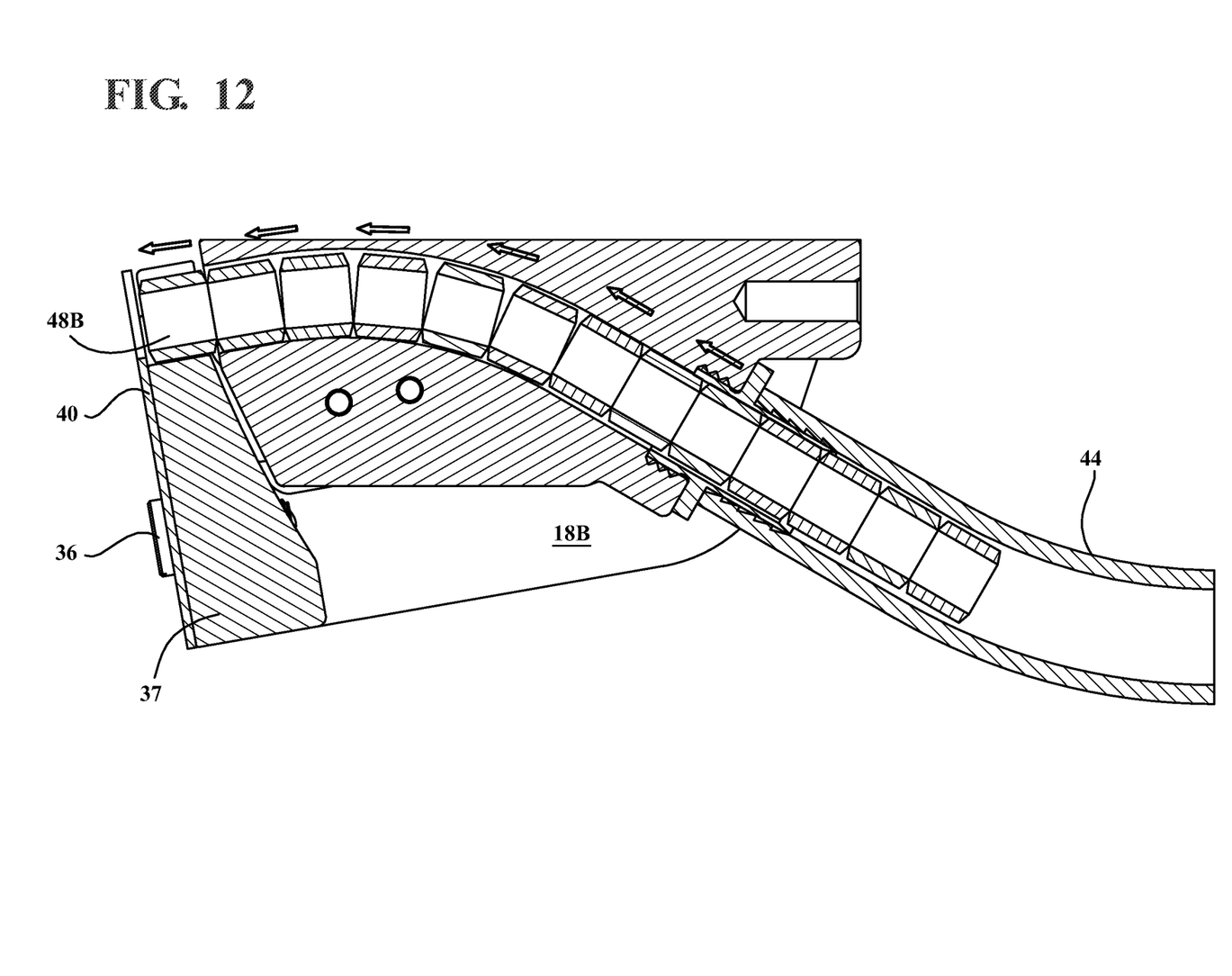
FIG. 12 is a side view in section of the feeder tube in the front moveably body assembly.

As shown in FIGS. 10 and 11, compression of the secondary springs occurs during the swaging and pulling functions performed by the nose assembly 12 in the tool 14 as shown in FIG. 12, the magazine tube 44 is bent downwardly as necessary. Before reaching the full down position shown, i.e., when only springs 32 are compressed, the inside face of member 37 prevents collar 48B from moving fully forward where it can be picked up by gripper 36. When the springs 30 are compressed by the final forward motion of the feeder device 10 in the swaging step, the lower assembly moves to the position shown, allowing the collar 48B to move between the now open jaws of the gripper and where the locator stop plate 40 stops and positions the collar. The lockbolt collar 48B is then picked up by the lower assembly and will be raised up into the presentation position once the operator releases pressure on the tool and backs it away from the finished, swaged collar on the previous lockbolt. The tube 44 is stationary and connects to fitting 50 (see FIG. 11). Fitting 50 attaches to front movable body upper assembly 100. The front movable body upper assembly has an internal channel that the collars travel through to the loading position As shown in FIGS. 10 and 11, the operator has swaged the collar pressure on the tool; i.e., the lower assembly 18 is still in the down position and the swaging process is in operation so as to swage the collar onto the lockbolt shank and put sufficient axial load onto the pintail of the lockbolt to break it off to complete the installation process.

Figure 7:
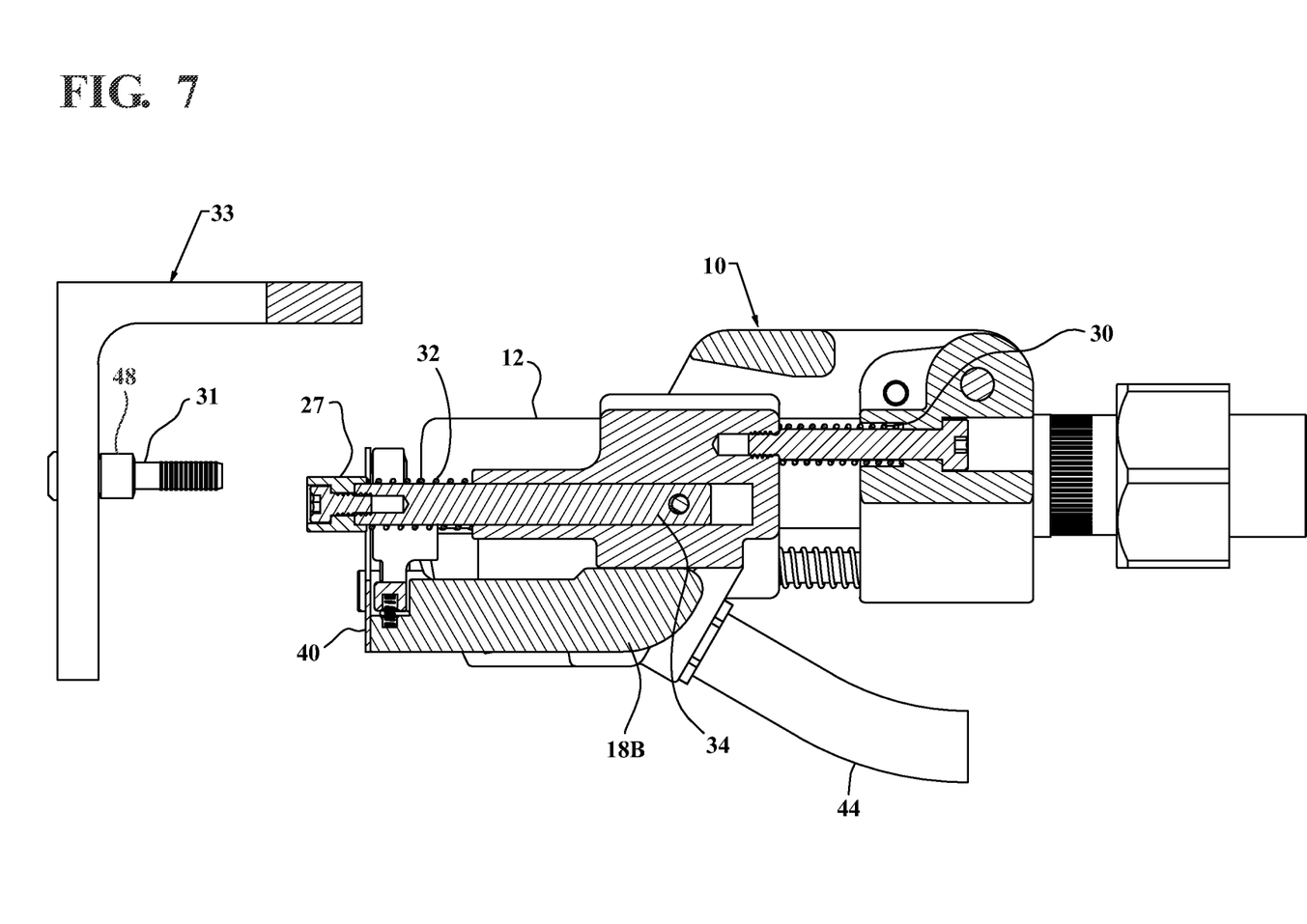
FIG. 7 is a side view of the feeder in section showing details of the actuator assembly after a collar has been swaged.

FIG. 7 shows the feeder 10 is pulled away from the swaged fastener and both primary and secondary springs re-expand to their uncollapsed positions driving the lower assembly 18 with a newly loaded collar back to the raised starting position such that the next collar from magazine 44 is now in the presentation position ready to be inserted on the next lockbolt shank and to begin the process over again.

Summarizing the apparatus, the feeder 10 is mounted on a nose assembly capable of swaging collars on lockbolts, and the front movable body assembly is connected to an air-driven collar supply. Springs 30, 32 urge the actuation members 28A-28B away from the body of the front movable body assembly 100 and the shoulder bolts 24 reside in the lower ends of slots 22 as shown in FIG. 8. The cams 41 allow the gripper 36 to hold a collar in the presentation position. When members 28A-28B are pushed against workpiece 33, springs 32 collapse, bolts 24 ride up slots 22 to pivot the lower assembly 18 down; simultaneously, cams 41A, 41B open the gripper 36 to allow the next collar to be picked up from the magazine 44.

SUMMARY OF OPERATION

Summarizing the method of operation of the feeder device 10, the device is attached to the nose assembly of a swaging tool and to a supply of serially-arranged swageable collars. A collar is brought to the presentation position in axial alignment with the nose assembly anvil and steered by the operator onto a lockbolt shank. The operator pushes the device 10 against the workpiece surface to compress the primary springs 32 in the upper assembly 100 and drop the lower assembly 18 down. This opens the gripper to release one collar onto the lockbolt and make ready to receive the next collar from magazine 44. The operator presses the trigger on the tool 14 to swage the collar that has been placed on a lockbolt shank. This action fully compresses the springs 30, 32 and opens the gripper. The operator then withdraws the tool and feeder device, allowing the primary and secondary springs to expand, raising the lower assembly legs and bringing a new collar up to the presentation position. The operator can perform these steps with one hand.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures and methods of use as is permitted under the law. For example, the device can also operate with one set of springs which are fully compressed by the operator, thus eliminating the two-stage compression function described above.

What is claimed is:

1. A method for placing swagable collars on the shanks of lockbolts pre-located and extending from a work surface utilizing a swaging tool with a tool axis and collar feeder assembly having a collar gripper, a magazine containing coaxially stacked collars, and pair of parallel mounted, spring biased actuator elements mounted on the collar feeder assembly extending axially forward of the swaging tool and mechanically constrained to be resiliently displaceable axially rearwardly relative to the swaging tool wherein the method comprises the steps of:

attaching the magazine to the collar feeder assembly to urge a plurality of collars along a path substantially parallel to the tool axis thereby to place a first collar in the gripper, one at a time;

placing the first collar in the gripper and locating the first collar onto a lockbolt shank;

pressing the actuator elements against the work surface adjacent the lockbolt shank containing the first collar to resiliently displace the actuator elements axially rearwardly of the tool;

using the actuator elements to pivotably displace the collar gripper and magazine about an axis orthogonal to the tool axis to release the first collar on the lockbolt shank from the collar gripper thereby to allow a second collar to enter the collar gripper from the magazine;

swaging the first collar that is released onto the lockbolt shank; and pulling the swaging tool away from the work surface and the lockbolt shank to re-extend the actuator elements forwardly and relocate the gripper with the second collar therein into axial alignment with the swaging tool.

2. A method of installing swagable collars onto shanks of lockbolts pre-located and extending from a work surface using a swaging tool with a nose assembly defining a tool axis, comprising the steps of:
 a. installing a feeder assembly on the swaging tool comprising a stationary assembly on the nose assembly, a lower assembly pivotally attached to the stationary assembly and adapted to carry a collar gripper and a magazine loaded with coaxially stacked annular collars biased for forward movement substantially parallel to the swaging tool axis toward the collar gripper, and an actuator mechanism having a pair of contact elements resiliently mounted for movement parallel to the tool axis and extending forwardly of the nose assembly for engagement with said work surface, and a pair actuator elements connecting said contact elements to said lower assembly to pivot said lower assembly about an axis orthogonal to the tool axis;
 b. loading a collar from the magazine into the collar gripper;
 c. using the swaging tool with the installed feeder assembly in alignment with the tool axis to place said collar onto a shank of a lockbolt;
 d. pressing the contact elements against the work surface adjacent the lockbolt shank to resiliently displace the actuator elements axially rearwardly of the swaging tool and pivot the lower assembly about said orthogonal axis;
 e. releasing the collar onto the lockbolt from the collar gripper to thereby allow a second collar to enter the collar gripper from the magazine;
 f. swaging the collar that is released onto the lockbolt shank; and
 g. pulling the swaging tool axially away from the work surface and the lockbolt to re-extend the actuator elements forwardly and pivot the lower assembly back into axis alignment with the tool axis.

* * * * *